C. BRAUN.
MOLD FOR CONCRETE STRUCTURES.
APPLICATION FILED NOV. 14, 1914.

1,175,044.

Patented Mar. 14, 1916.
2 SHEETS—SHEET 1.

WITNESSES:

INVENTOR:
Casper Braun

C. BRAUN.
MOLD FOR CONCRETE STRUCTURES.
APPLICATION FILED NOV. 14, 1914.

1,175,044.

Patented Mar. 14, 1916.
2 SHEETS—SHEET 2.

Fig. 2ª

WITNESSES:

INVENTOR:
Casper Braun

THE COLUMBIA PLANOGRAPH CO., WASHINGTON, D. C.

UNITED STATES PATENT OFFICE.

CASPER BRAUN, OF BERLIN, ONTARIO, CANADA.

MOLD FOR CONCRETE STRUCTURES.

1,175,044.  Specification of Letters Patent.  Patented Mar. 14, 1916.

Application filed November 14, 1914. Serial No. 872,264.

*To all whom it may concern:*

Be it known that I, CASPER BRAUN, a subject of the King of Great Britain, and resident of the city of Berlin, in the county of Waterloo, in the Province of Ontario, in the Dominion of Canada, have invented certain new and useful Improvements in Molds for Concrete Structures, as described in the following specification and illustrated in the accompanying drawings, that form part of the same.

The principal objects of the invention are, to reduce the cost in building construction particularly in the erection of small houses, to effect a saving of time and labor in the construction of the building, and to devise a mold structure adapted to be framed up to form the complete walls of the building, thereby producing in the building a structure of uniform strength and appearance.

A further object of the present invention is to so mold the walls that the exterior surface thereof will bear a smooth and uniform appearance and may be molded to represent brick or stone.

A still further object is to devise a form of mold which may be readily assembled, and quickly removed and again utilized in the formation of another building.

The principal feature of the invention consists in the novel construction and arrangement of the mold parts, whereby the several inner and outer sections of the mold are joined together to form a complete mold for the entire structure and are firmly secured against lateral pressure in both directions to maintain the mass of concrete of the entire wall in shape until set, and whereby the mold sections may be readily removed intact.

Figure 1:
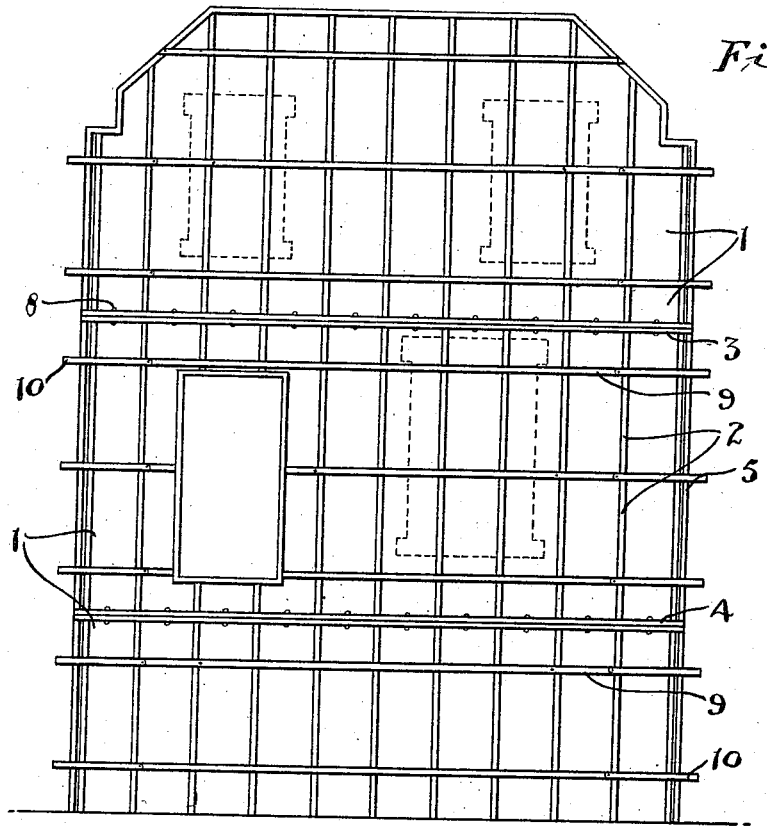
Figure 2:
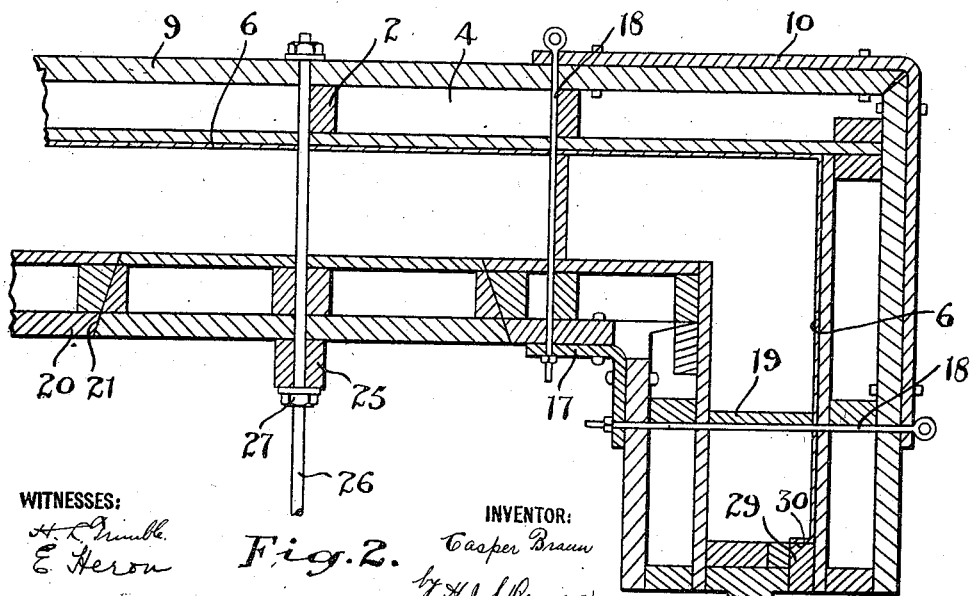
Figure 4:
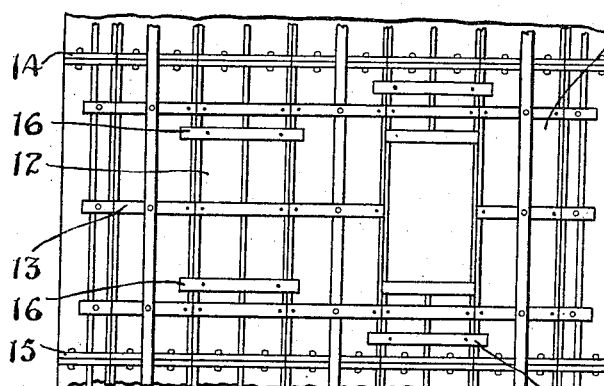
Figure 5:
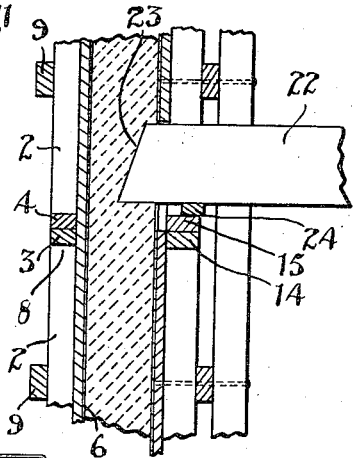
Figure 3:
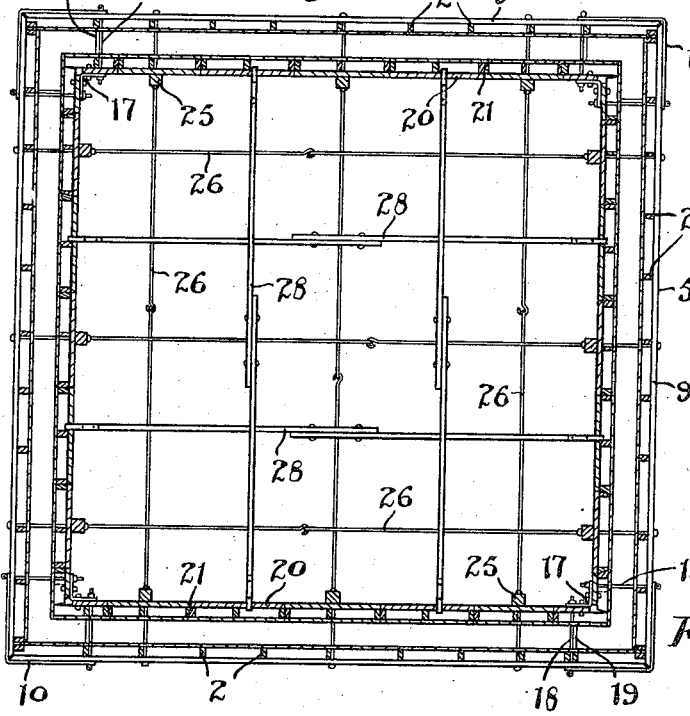
Figure 6:
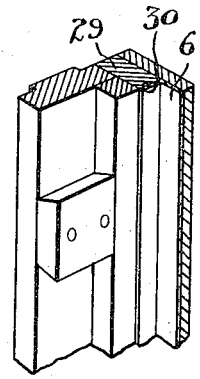
Figure 6:
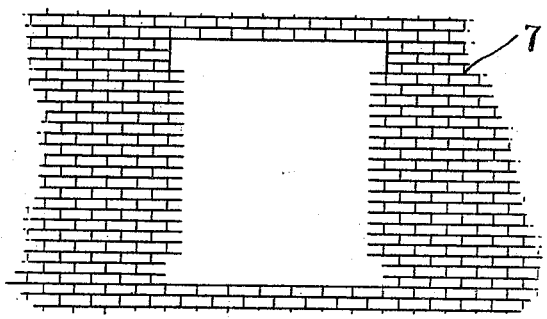

In the drawings, Figure 1 is an elevational view of the outside of one side of a mold for the construction of a small house. Fig. 2 is an enlarged horizontal sectional detail illustrating the corner structure and also the arrangement of the mold at a door opening and also showing the particular structure of the inner mold panel. Fig. 2ª is a perspective view showing the manner of securing the outer side of a door or window frame to the concrete. Fig. 3 is a horizontal sectional plan view of the mold showing the manner of bracing the mold against inward or outward distortion. Fig. 4 is an elevational view of a portion of the inside of a mold. Fig. 5 is an enlarged vertical sectional view through a portion of the mold showing the manner of securing the panels together and of supporting the joists. Fig. 6 is a view of a portion of the face of one of the outer mold panels showing the arrangement of the strips for marking the outer surface of the wall.

Like numerals of reference indicate corresponding parts in each figure.

Referring to the drawings, 1 are the outer mold panels, which are here shown formed of a plurality of two by four studs 2 spaced equidistant and having a cap 3 and sill 4. The frame 5 thus formed is faced with one inch boards and the inner surface of said panels is covered with a surfacing of zinc plate 6. Attached to the inner surface of the zinc plates 6 are a plurality of thin strips 7 preferably formed with beveled edges and adapted to form seams or joints representing the seams or joints between bricks or blocks of stone.

The panels 1 are preferably made the full length of the width or length of the house or building to be erected and these are mounted one upon the other, the sills 4 resting upon the caps 3 of the lower mold section and each panel is rigidly secured to the other by means of bolts 8 extending through the meeting caps and sills. Where the end edges of the panels meet one panel is adapted to overlap the other to form a proper joint and the supporting strips 9 at the back or outer sides of the studs 2 are provided with metal angle members 10, which members extend around the corners of the outer section of the mold and are securely bolted in place.

The inner mold panels 11 are formed of a plurality of narrow sections or panels 12 which are fitted together and spaced a uniform distance from the inner face of the outer mold panels. These inner panels are not necessarily provided with a metallic facing or with any special arrangement of tiling surface. These panels are provided with the cross battens 13 forming the frame portions also having the caps and sills 14 and 15 respectively, similar to the caps and sills 3 and 4 and each alternate panel is provided with elongated battens 16 adapted to overlap the abutting edge posts of the adjacent panels, as particularly shown in Fig. 4.

17 are metallic corner brackets secured to the ends of the battens 13 and adapted to rigidly connect the corners of the inner panels.

18 are bolts extending through the inner and outer corner brackets 10 and 17, thus securely tying the outer and inner molds together and also tying the corners of the molds in a secure joint.

19 are spacing members inserted between the inner and outer faces of the inner and outer molds respectively adjacent to the bolts 18, being adapted to hold the molds in their proper relative position. The inner mold panels 12 are formed with parallel sides except that in one side, one of the panels 20 is formed with beveled vertical sides sloping outwardly and the adjacent panels are formed with correspondingly beveled edges 21.

This construction is desirable in order that the last panel or section may be readily placed in position and so that it may be readily and quickly removed forming the first removable section. Numerous bolts are passed through the strips 9 at convenient points in order to bind the outer and inner panels securely and wherever such bolts are inserted spacing members 19 are preferably utilized.

When the panels of the first floor section of the building are placed in position upon the basement panel, the joists 22 are placed in position above the sill of the inner panel and have their beveled ends 23 inserted through suitable slots cut in the inner panels and projecting into the space between the molds. Wedge blocks 24 are inserted beneath the joists 22 to raise them clear of the slotted sills 15 so that when the molds are to be taken down the wedges may be easily removed and the inner molded sections removed without difficulty.

The same operation is repeated in placing the first floor joists. When the joists and inner frame work supporting their inner ends are thus located, vertical bracing members 25 in the form of heavy scantlings are placed against the inner sides of the inner molds and extend below the joint between the basement and ground floor sections and above the joint between the ground floor and first floor sections.

26 are bolts inserted through the bracing members 25 and passing to the extreme outside of the molds. The inner ends of these bolts are formed into hook shape and the opposing bolts are adapted to be hooked together, thus forming tie rods extending completely across the building, being held securely upon the outside and having locking nuts 27 upon the inner side of the bracing members 25. The building is braced both ways by any desirable number of these tie bolts and the mold is thus held securely from bulging. In order to obviate any possibility of the molds bulging inwardly, I provide a plurality of strut braces 28 in the form of scantlings having hook shaped irons on the outer ends adapted to hook over the battens 13 merely to hold the struts in place. These struts are adjusted in the center having a plurality of bolt holes therethrough and adapted to be secured together by bolts holding them rigidly thus obviating any tendency to collapse or in the structure bulging inwardly.

A molded structure thus constructed is very readily assembled and when assembled is of a very rigid nature. In building small buildings, such as six, seven, eight or nine roomed houses the entire mold is erected, the joists placed in position and all window and door frames secured in place from the inner side, suitable openings being provided in the inner panels for such frames which are placed in position closely engaging the inner face of the outer mold. The tiling surface of the outer mold is arranged as illustrated in Fig. 6 so as to fit the window structure.

In the arrangement of the door frames, the sides and lintel are fitted with a temporary strip 29 at the outer side which fits against the inner face of the outer mold which is provided with a corresponding opening to allow of access to the building during construction. The inner panel is also formed with an opening corresponding to the opening of the frame.

The strips 29 temporarily secured to the outer side of the frame and of substantially the same thickness as half of the width of a brick are provided on the inner edge 30 with molding strips corresponding with the strips 7 on the inner face of the zinc facing 6, so that the molded material poured in between the inner and outer molds will be molded to the appearance of bricks jutting outwardly beyond the door frame. These strips may be removed from the door frame after the removal of the outer mold panels.

Each of the door and window frames is provided with a plurality of dove-tail shaped blocks arranged transversely back of the facing strip and the concrete flowing in around said blocks locks the frame securely in place in the molded wall.

In the use of this mold, after it is set up in the manner described the concrete is poured in to the space between the inner and outer mold sections until such space is completely filled up from top to bottom. The mixture is of a fine nature and fairly fluid so that the finished surface against the outer metal covered mold will be comparatively smooth and uniform in texture. The weight of the mass of semi-fluid concrete in a mold consisting of the entire walls of the house or building is very considerable but by means of the special structure herein described the corner bracing and cross interior bracing hold effectively against internal and external bulging. The mold is held perfectly rigid and is so retained until the concrete material in the walls is set. When the material is set the cross or tie bolts 26 are first removed, the inner ends being unhooked and the outer nuts removed and the bolts drawn inwardly. When these bolts are removed the bracing scantlings 25 are withdrawn as also are the strut braces 28. The inner molds are then removed and by virtue of the construction of the panel with the beveled edges, their removal is rendered very simple as this panel is removed first and drawn inwardly and the remainder can be readily separated. The remaining bolts are then withdrawn from the concrete mass and the sections or panels of the outer mold are taken down one at a time. The inner frame work of the house is thus cast solidly in position into the walls and the whole structure sets firmly and securely together. The roof may then be placed in position and when the walls are sufficiently dry they may be treated in the same manner as any other form of structure.

In a small sized house a mold such as described may be erected in the course of a few hours and by means of a suitable concrete mixer and elevating plant the concrete is poured into the mold and the mold completely filled in a very short time. The carpentry work required in the placing of the joists and interior frame work for supporting said joists is carried on while the molds are being erected, consequently the whole frame of the house can be completed in the course of a few hours. The mold is of course, retained in position until the walls are sufficiently set so that there will be no danger of bulging or collapse when these are removed.

What I claim as my invention is:—

1. A mold for concrete structures, comprising, a plurality of panels having a flush inner face and a rigid frame on the outer side, said panels being detachably connected at the corners to form a rigid encircling outer wall, a plurality of separable inner panels spaced from said outer panels and rigidly connected together to form the inner wall of the mold, means for rigidly tying the inner and outer panels in their spaced arrangement, tie rods extending transversely of the mold structure from outside wall to outside wall and through the inner and outer panels being adapted to hold the walls of the mold from bulging outwardly, and rigid interior brace members extending transversely of the structure and forming rigid struts engaging the inner walls of the mold to support the walls from bulging inwardly.

2. A mold for concrete structures, comprising, a plurality of rigid panels arranged in tiers detachably connected at the corners to form a rigid encircling outer wall, each of said panels having a flush inner face and a rigid frame on the outer side, said frames having caps and sills at the top and bottom respectively, the sill of the upper tier being securely bolted to the cap of the lower tier, means for reinforcing the meeting corner edges of said panels, inner panels formed of a plurality of vertical separable sections adapted to be spaced from the outer panels and rigidly secured to form a mold, one of said sections having the vertical sides beveled to fit the beveled vertical sides of two adjacent sections, and means for bracing the whole molded structure against bulging inwardly or outwardly.

3. A mold for concrete structures, comprising, a plurality of rigid panels arranged in tiers detachably connected at the corners to form a rigid encircling outer wall, said panels presenting a flush inner face, inner panels spaced from the outer panels and rigidly secured to form a mold, said inner panels being the full height of one story of the structure and having caps and sills, the sills of each set of panels and the panels being slotted at intervals to allow the insertion of the ends of the joists of the building into the mold to be molded into the concrete walls, said joists being supported from the caps of the lower panels, removable wedge supports adapted to be placed on the caps of the lower panels to support said joists in position, and means for rigidly supporting the panels.

4. A mold for concrete structures, comprising, an outer wall formed of a plurality of panels each extending the entire length of the wall and mounted vertically one upon the other to form the entire height of the building to be molded, the meeting edges of the panels being flanged outwardly and bolted securely together, an inner wall formed of a plurality of separable panels, spaced from the outer wall and rigidly secured, rigid vertical brace members arranged on the inner side of said inner panels and extending above and below the horizontal joints formed by the flanged edges of the intermediate and upper panels, tie rods extending across the space between the inner panels and through said braces and through the inner and outer mold walls, said rods having separable inner ends connected together and having nuts arranged on their outer ends to engage the outer panels and the inner sides of said vertical braces, and rigid spacing braces adapted to extend between the inner panels to brace the mold from inward bulging.

Signed at the city of Berlin, county of Waterloo, Province of Ontario, in the Dominion of Canada, this 23rd day of October, 1914.

CASPER BRAUN.

Witnesses:
MAMIE MARTIN,
W. H. GIEGER.

Copies of this patent may be obtained for five cents each, by addressing the "Commissioner of Patents, Washington, D. C."